(12) United States Patent
Tanaka et al.

(10) Patent No.: US 11,351,856 B2
(45) Date of Patent: Jun. 7, 2022

(54) WORK VEHICLE

(71) Applicant: KUBOTA CORPORATION, Osaka (JP)

(72) Inventors: Ryosuke Tanaka, Osaka (JP); Satoru Yamanaka, Osaka (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/026,881

(22) Filed: Sep. 21, 2020

(65) Prior Publication Data

US 2021/0122231 A1    Apr. 29, 2021

(30) Foreign Application Priority Data

Oct. 23, 2019  (JP) .............................. JP2019-193043

(51) Int. Cl.
| | |
|---|---|
| *F01P 11/12* | (2006.01) |
| *F02M 35/06* | (2006.01) |
| *B60K 11/08* | (2006.01) |
| *F01P 3/18* | (2006.01) |
| *B60K 13/02* | (2006.01) |
| *F01P 11/04* | (2006.01) |
| *F01P 5/06* | (2006.01) |

(52) U.S. Cl.
CPC .............. *B60K 11/08* (2013.01); *B60K 13/02* (2013.01); *F01P 3/18* (2013.01); *F01P 5/06* (2013.01); *F01P 11/04* (2013.01); *F02M 35/06* (2013.01)

(58) Field of Classification Search
CPC ...... F01P 11/12; F02M 35/164; F02M 35/161
See application file for complete search history.

(56) References Cited

U.S. PATENT DOCUMENTS

| | | | |
|---|---|---|---|
| 6,068,675 A | 5/2000 | Tsuda et al. | |
| 2008/0016833 A1* | 1/2008 | Sheidler | A01D 41/1252 55/385.3 |
| 2009/0145577 A1* | 6/2009 | Shuttleworth | F01P 5/06 165/47 |
| 2010/0006361 A1* | 1/2010 | Vandike | F04D 25/166 415/58.4 |
| 2010/0071978 A1* | 3/2010 | Kisse | F02M 35/08 55/385.3 |
| 2015/0233328 A1* | 8/2015 | Ghorpade | F02M 35/06 415/121.2 |

FOREIGN PATENT DOCUMENTS

JP          11-78987 A       3/1999

* cited by examiner

*Primary Examiner* — Long T Tran (74) *Attorney, Agent, or Firm* — Greenblum & Bernstein, P.L.C.

(57) ABSTRACT

The disclosure provides a work vehicle in which clogging of a filter of an air cleaner with snow can be suppressed. The work vehicle includes: a radiator that cools cooling water for an engine; an air cleaner that cleans air to be fed to the engine; and an inlet hose that has an aspiration port open on a rear side of the radiator and leads the air from the aspiration port to the air cleaner. The radiator includes a shroud having an opening in which a fan of the engine is disposed and the aspiration port is disposed not to overlap with the opening of the shroud in back view.

20 Claims, 10 Drawing Sheets

WORK VEHICLE

TECHNICAL FIELD

The disclosure relates to a technique of a work vehicle including an air cleaner.

BACKGROUND ART

Conventionally, there is a known technique of a work vehicle including an air cleaner. For example, such a technique is described in JP H11-78987 A, for example.

A tractor (work vehicle) described in JP H11-78987 A includes a radiator, an air cleaner disposed on a rear side of the radiator, and an intake pipe (inlet hose) extending forward from the air cleaner. The intake pipe is provided to pass above the radiator to be open on a front side of the radiator.

In the tractor described in JP H11-78987 A, air is introduced from a space on the front side of the radiator into the air cleaner through the intake pipe. With this configuration, however, when the tractor is driven in snow (in a cold region, for example), snow coming inside a hood may be drawn in from the intake pipe to clog a filter of the air cleaner in some cases.

SUMMARY OF INVENTION

The disclosure has been made with the above-described circumstances in view and the object of the disclosure is to provide a work vehicle in which clogging of a filter of an air cleaner with snow can be suppressed.

The problem to be solved by the disclosure is as described above and a solution to the problem will be described next.

In other words, a work vehicle according to the disclosure includes: a radiator that cools cooling water for an engine; an air cleaner that cleans air to be fed to the engine; and an inlet hose that has an aspiration port open on a rear side of the radiator and leads the air from the aspiration port to the air cleaner.

In the work vehicle according to the disclosure, the radiator includes a shroud having an opening in which a fan of the engine is disposed and the aspiration port is disposed not to overlap with the opening of the shroud in back view.

In the work vehicle according to the disclosure, the aspiration port is disposed at a lower position than a central portion in a vertical direction of the radiator.

In the work vehicle according to the disclosure, the aspiration port is disposed in a vicinity of a cooling water hose through which the cooling water flows between the radiator and the engine.

In the work vehicle according to the disclosure, the cooling water hose includes a lower hose through which the cooling water flows between a lower portion of the radiator and the engine and the aspiration port is disposed in a vicinity of the lower hose.

In the work vehicle according to the disclosure, the aspiration port is disposed to overlap with the lower hose in plan view.

In the work vehicle according to the disclosure, the air cleaner is disposed on the rear side of the radiator.

In the work vehicle according to the disclosure, the inlet hose is installed along the radiator from an upper portion to a lower portion of the radiator with an upper end portion connected to the air cleaner and the aspiration port formed in a lower end portion.

As effects of the disclosure, the disclosure exerts the following effects.

In the work vehicle according to the disclosure, it is possible to suppress clogging of a filter of the air cleaner with snow.

In the work vehicle according to the disclosure, it is possible to save space.

In the work vehicle according to the disclosure, it is possible to facilitate installation of the inlet hose.

In the work vehicle according to the disclosure, it is possible to effectively suppress the clogging of the filter of the air cleaner with the snow.

DESCRIPTION OF EMBODIMENT

In the following description, directions shown by arrows U, D, F, B, L, and R in the figures are defined as upward, downward, forward, backward, leftward, and rightward directions, respectively.

Figure 1:
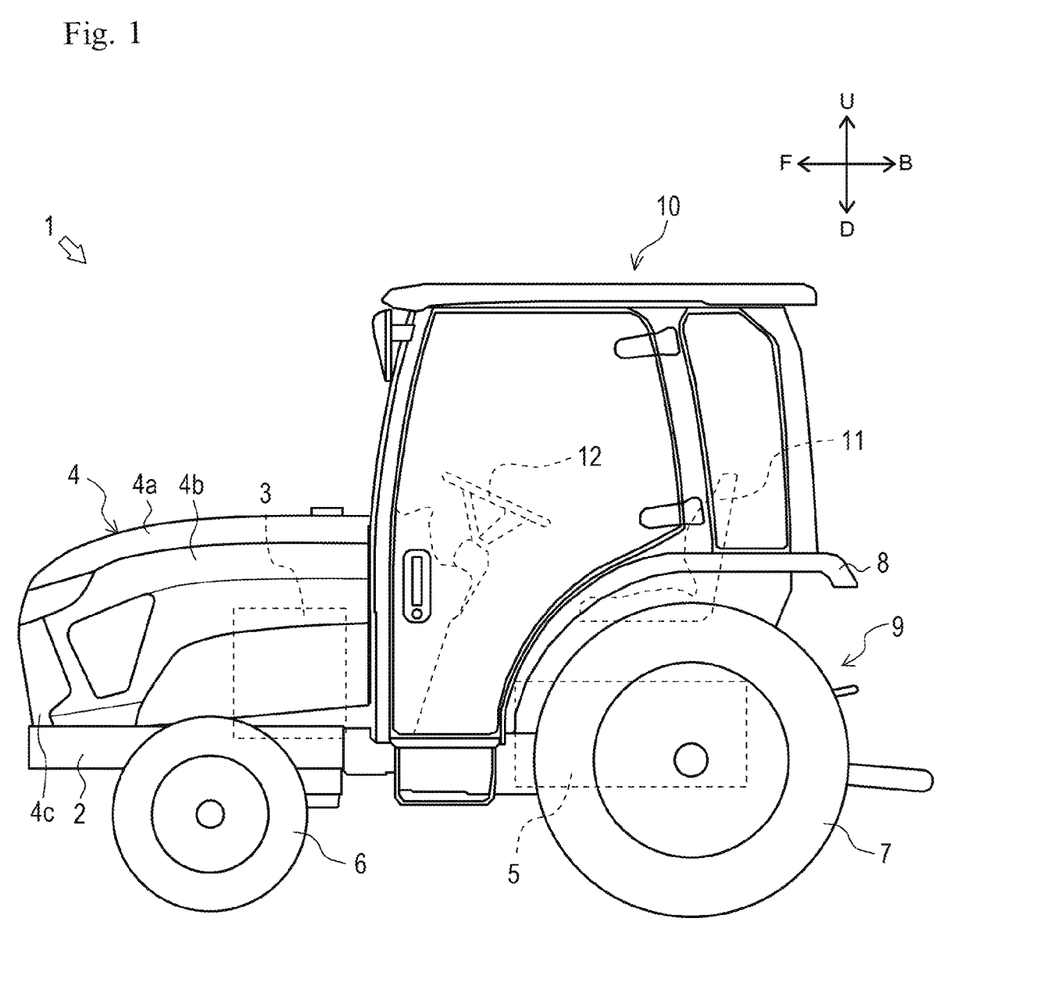
FIG. 1 is a left side view of an overall configuration of a tractor according to an embodiment of the disclosure.

With reference to FIG. 1, a tractor 1 according to an embodiment of the disclosure will be described below.

The tractor 1 mainly includes a body frame 2, an engine 3, a hood 4, a transmission case 5, front wheels 6, rear wheels 7, fenders 8, a lift 9, a cabin 10, a seat 11, a steering wheel 12, and the like.

The body frame 2 is a frame-shaped member formed by appropriately combining a plurality of panel members. The body frame 2 is formed in a substantially rectangular shape in plan view. The body frame 2 is provided to a front portion of the tractor 1 with a longitudinal direction oriented in a front-back direction. The engine 3 is disposed at a rear portion of the body frame 2 and covered with the hood 4. The hood 4 has a top panel 4a disposed above the engine 3, side panels 4b disposed on left and right outer sides of the engine 3, a front panel 4c disposed on a front side of the engine 3, and the like and can be opened and closed. Outside air can be introduced into the hood 4 through the side panels 4b and the front panel 4c. The transmission case 5 is fixed to a rear portion of the engine 3.

A front portion of the body frame 2 is supported by the pair of left and right front wheels 6 with a front axle mechanism (not shown) interposed therebetween. A rear portion of the transmission case 5 is supported by the pair of left and right rear wheels 7 with a rear axle mechanism (not shown) interposed therebetween. The paired left and right rear wheels 7 are covered with the fenders 8 approximately from above.

The lift 9 is provided to the rear portion of the transmission case 5. Various work implements (e.g., a cultivator and the like) can be attached to the lift 9. The lift 9 can raise and lower the attached work implement with actuators such as hydraulic cylinders. It is possible to transmit power of the engine 3 to the lift 9 via a PTO (Power Takeoff) shaft (not shown).

The power of the engine 3 is changed in speed by a transmission (not shown) housed in the transmission case 5 and then can be transmitted to the front wheels 6 via the front axle mechanism and can be transmitted to the rear wheels 7 via the rear axle mechanism. The power of the engine 3 drives the front wheels 6 and the rear wheels 7 for rotation to thereby allow the tractor 1 to travel. The power of the engine 3 can drive the work implement attached to the lift 9.

The cabin 10 is provided behind the engine 3. Inside the cabin 10, a living space which an operator gets into is formed. The seat 11 in which the operator sits is disposed substantially at the center of the cabin 10. In a front portion of the cabin 10, the steering wheel 12 for adjusting a steering angle of the front wheels 6 is disposed. An air-conditioning unit (not shown) for sending conditioned air into the living space is provided to the cabin 10.

A layout of respective members in the hood 4 will be described below with reference to FIGS. 2 to 6.

In the hood 4, the engine 3, a battery 21, straightening plates 22, a radiator 23, cooling water hoses 24, a partition portion 30, an air cleaner 40, an inlet hose 50, an outlet hose 61, a DPF (Diesel Particulate Filter) 62, a muffler 63, an alternator 64, a compressor 65, a fuel tank 66, and the like are disposed.

Figure 2:
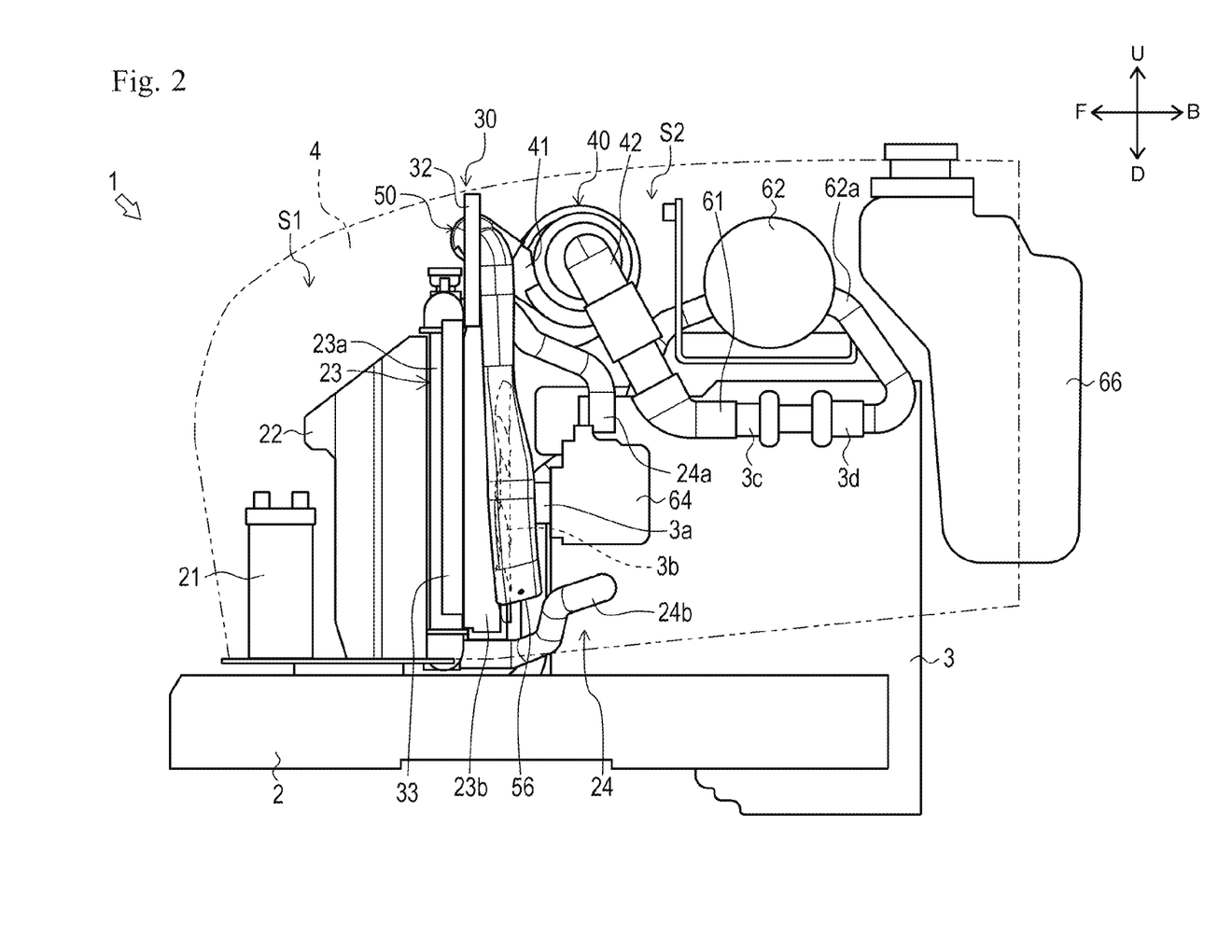
FIG. 2 is a left side view of a configuration in a hood.
Figure 3:
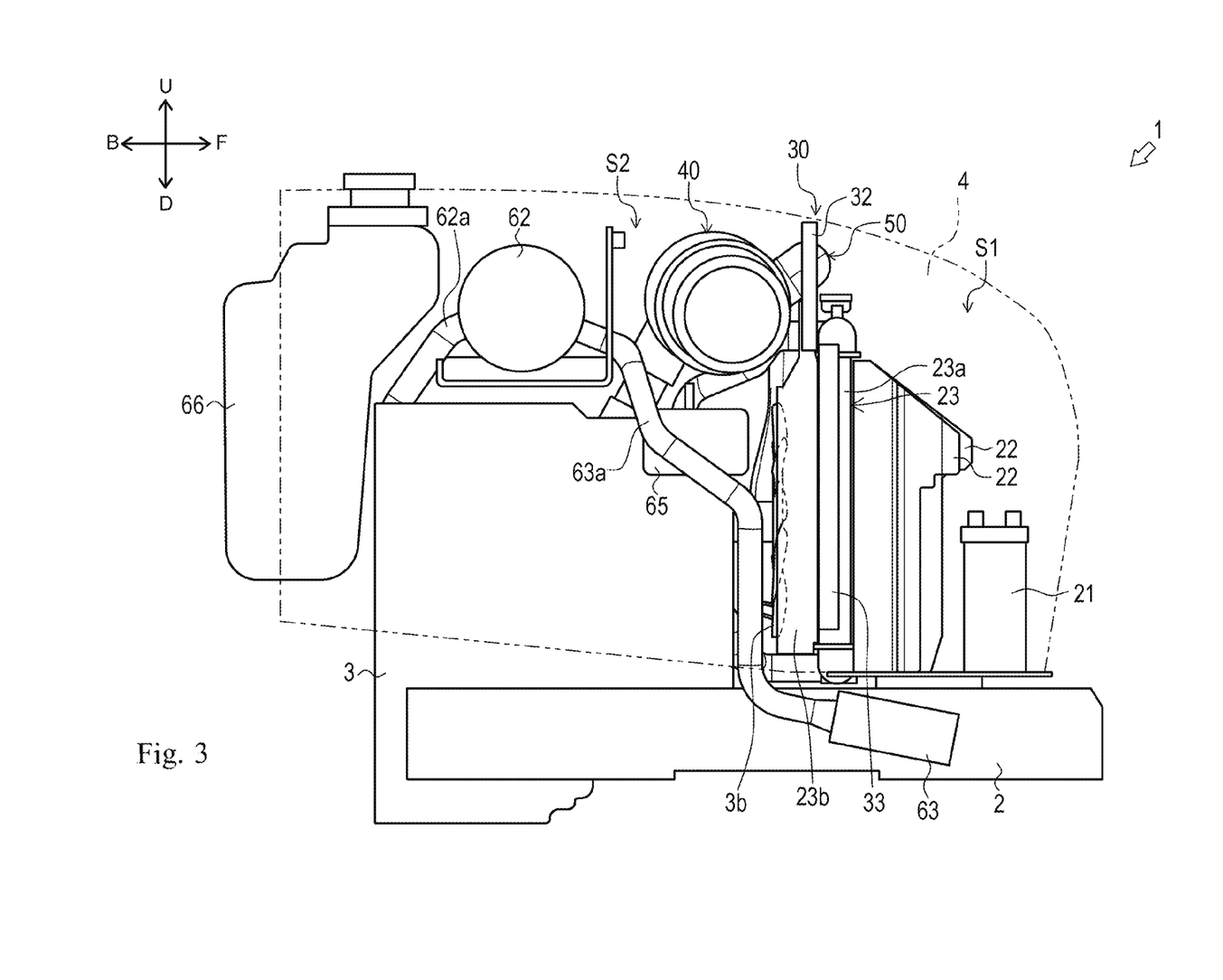
FIG. 3 is a right side view of the configuration in the hood.

The engine 3 shown in FIGS. 2 and 3 is disposed in a rear portion of the hood 4 and supported on the body frame 2. The engine 3 has a shaft 3a, a fan 3b, an intake port 3c, and an exhaust port 3d.

The shaft 3a is for transmitting the power to the fan 3b (described later). The shaft 3a protrudes forward from the engine 3.

The fan 3b sends the air backward. The fan 3b is disposed behind a core 23a of the radiator 23 (described later) to face the core 23a. The fan 3b is driven by the power transmitted from the engine 3 via the shaft 3a and the like.

The intake port 3c is for drawing in the outside air. The exhaust port 3d is for emitting exhaust gas. The intake port 3c and the exhaust port 3d are formed on a left side of the engine 3.

Figure 4:
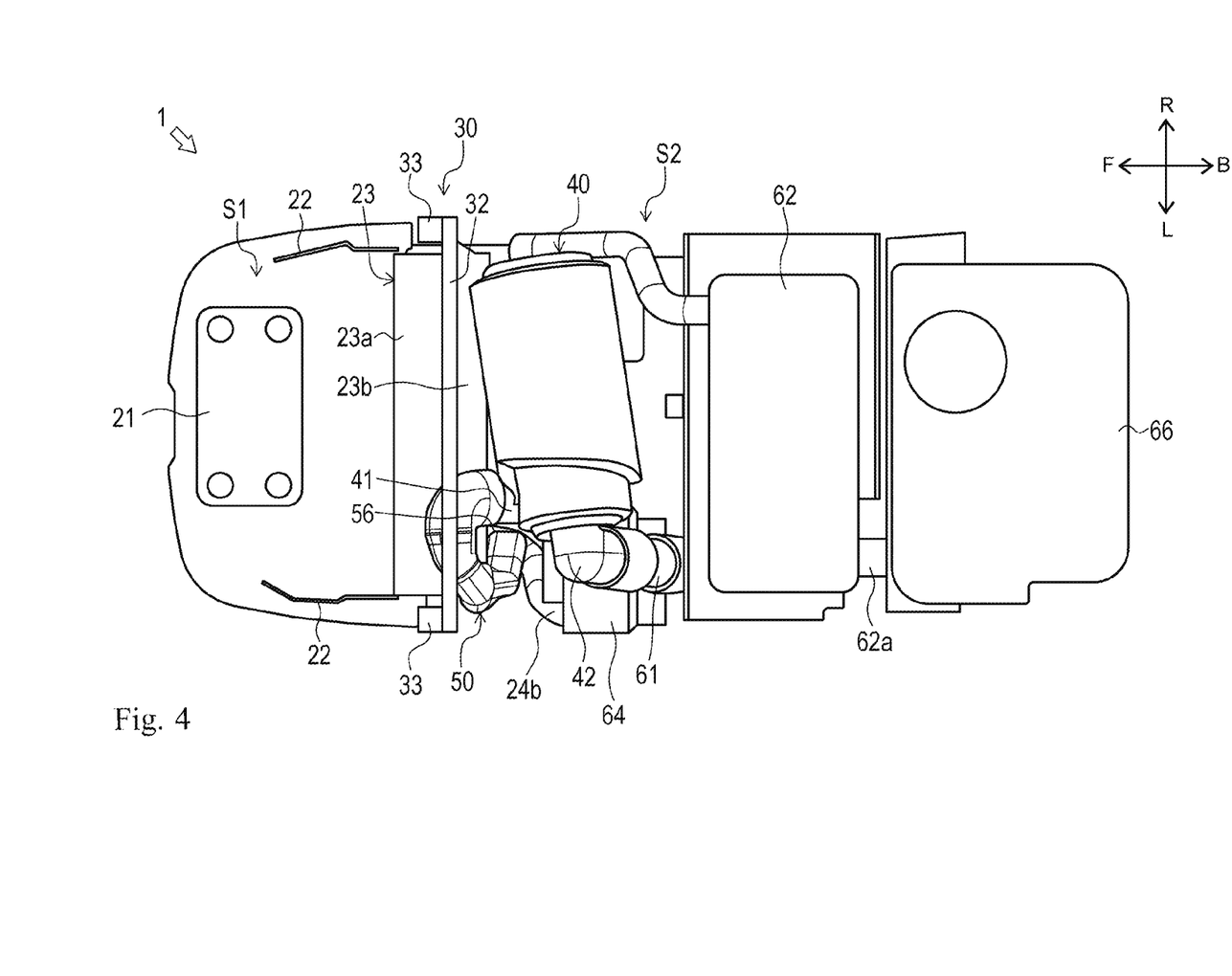
FIG. 4 is a plan view of the configuration in the hood.

The battery 21 shown in FIGS. 2 and 4 is for feeding electric power to devices to be powered in the tractor 1 (e.g., the air conditioner and a work light). The battery 21 is disposed in a front portion of the hood 4.

The straightening plates 22 are for straightening a flow of air in the hood 4. The straightening plates 22 are formed in substantially rectangular shapes in side view. The pair of left and right straightening plates 22 is provided. The straightening plates 22 are disposed on left and right rear outer sides of the battery 21.

The radiator 23 is for cooling cooling water for the engine 3. The radiator 23 is disposed on a rear and inner side of the left and right straightening plates 22. The radiator 23 has the core 23a and a shroud 23b.

The core 23a is for exchanging heat between the cooling water for the engine 3 and the air flowing in the hood 4. The core 23a is disposed at a front portion of the radiator 23.

The shroud 23b is for leading the air to the fan 3b. The shroud 23b is disposed at a rear portion of the radiator 23. The shroud 23b shown in FIG. 6 has an opening 23c in a substantially circular shape in back view and passing through the shroud 23b in a front-back direction. Inside the opening 23c, the fan 3b of the engine 3 is disposed.

The radiator 23 formed in this manner cools the cooling water when the fan 3b is driven. To put it concretely, when the fan 3b shown in FIG. 2 is driven, the air on a front side of the core 23a of the radiator 23 (the air flowing in the hood 4) is drawn in and passes through the core 23a. The radiator 23 exchanges the heat between the air and the cooling water to cool the cooling water. The fan 3b sends the air backward after the heat exchange.

The cooling water hoses 24 are hoses through which the cooling water flows between the engine 3 and the radiator 23. The cooling water hoses 24 include an upper hose 24a and a lower hose 24b.

The upper hose 24a leads the cooling water from the engine 3 to the core 23a. The upper hose 24a is connected to an upper end portion of the core 23a and a front portion of the engine 3.

Figure 5A:
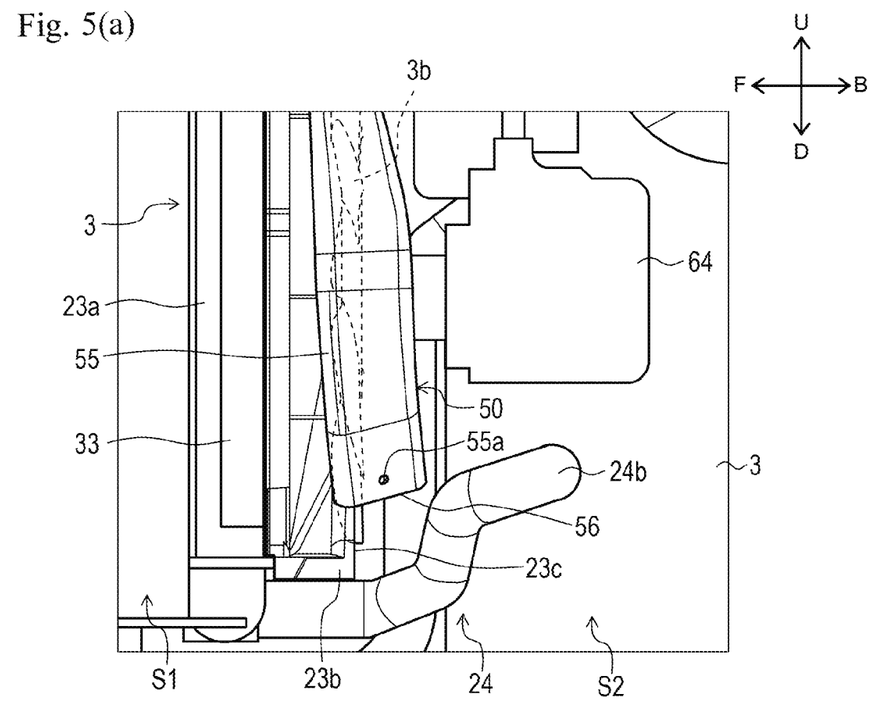
FIG. 5A is an enlarged side view of a suction port and members around the suction port.
Figure 5B:
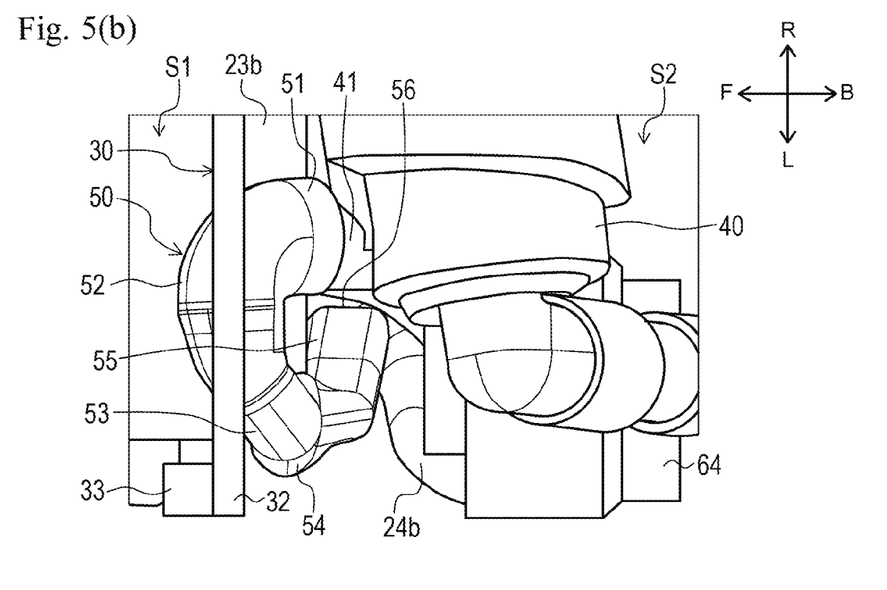
FIG. 5B is an enlarged plan view of the suction port and the members around the suction port.

The lower hose 24b shown in FIGS. 5A and 5B leads the cooling water from the core 23a to the engine 3. The lower hose 24b is connected to a lower end portion of the core 23a and the front portion (below the portion connected to the upper hose 24a) of the engine 3.

The partition portion 30 shown in FIGS. 2 and 4 partitions an inner space of the hood 4 into front and rear spaces. The partition portion 30 will be described later.

The air cleaner 40 is for cleaning the air and sending the air to the engine 3. The air cleaner 40 is formed in a substantially circular columnar shape with an axial direction oriented substantially in a left-right direction. In the air cleaner 40, a filter (not shown) or the like for removing dust from the air is provided. The air cleaner 40 is disposed behind the radiator 23 and above the engine 3. The air cleaner 40 has a suction port 41 and an emission port 42.

The suction port 41 is a portion connected to the inlet hose 50 (described later). The suction port 41 is formed to protrude from a left end portion of an outer peripheral face of the air cleaner 40. The suction port 41 is formed in a substantially cylindrical shape with an axial direction oriented forward and upward (backward and downward).

The emission port 42 is a portion connected to the outlet hose 61 (described later). The emission port 42 is formed to protrude from a left end face of the air cleaner 40. The emission port 42 is formed in a substantially cylindrical shape with an axial direction oriented forward and upward (backward and downward).

The inlet hose 50 is for leading the air in the hood 4 into the air cleaner 40. The inlet hose 50 will be described later.

The outlet hose 61 shown in FIG. 2 is for leading the air cleaned by the air cleaner 40 to the engine 3. The outlet hose 61 is connected to the emission port 42 of the air cleaner 40 and the intake port 3c of the engine 3.

The DPF 62 is for collecting PM (Particulate Matter) in the exhaust gas emitted from the engine 3. The DPF 62 is formed in a substantially circular columnar shape with an axial direction oriented in the left-right direction. In the DPF 62, a filter or the like for collecting the PM is provided. The DPF 62 is disposed behind the air cleaner 40 and above the engine 3. The DPF 62 is connected to the exhaust port 3d of the engine 3 by an introduction pipe 62a and the exhaust gas is introduced into the DPF 62 from the engine 3.

The muffler 63 shown in FIG. 3 is for emitting the exhaust gas outside. The muffler 63 is connected to the DPF 62 by an emission pipe 63a. The muffler 63 leads the exhaust gas (the exhaust gas after the collection of the PM) from the DPF 62 forward and downward and emits the exhaust gas outside under the right straightening plate 22.

The alternator 64 shown in FIGS. 2 and 4 is a device (electric generator) that generates electric power by use of the power from the engine 3. The alternator 64 is disposed behind the radiator 23 and on the left side of the engine 3. The alternator 64 is disposed to overlap with a front end portion of the engine 3 in side view. The alternator 64 is disposed at a higher position than the lower hose 24b.

The compressor 65 shown in FIG. 3 is for compressing refrigerant of the air-conditioning unit for the cabin 10 by use of the power from the engine 3. The compressor 65 is disposed behind the radiator 23 and on a right side of the engine 3. The compressor 65 is disposed to overlap with the front end portion of the engine 3 in side view and on a left side of the emission pipe 63a of the muffler 63.

The fuel tank 66 is a hollow member for storing fuel. The fuel tank 66 is disposed behind the engine 3 and the DPF 62.

The partition portion 30 will be described below with reference to FIGS. 6 and 7.

As described above, the partition portion 30 partitions the inner space of the hood 4 into the front and rear spaces. The partition portion 30 is made of material having elasticity (e.g., elastic resin material such as sponge and rubber). The partition portion 30 has a lower shield portion 31, an upper shield portion 32, and side shield portions 33.

Figure 7:
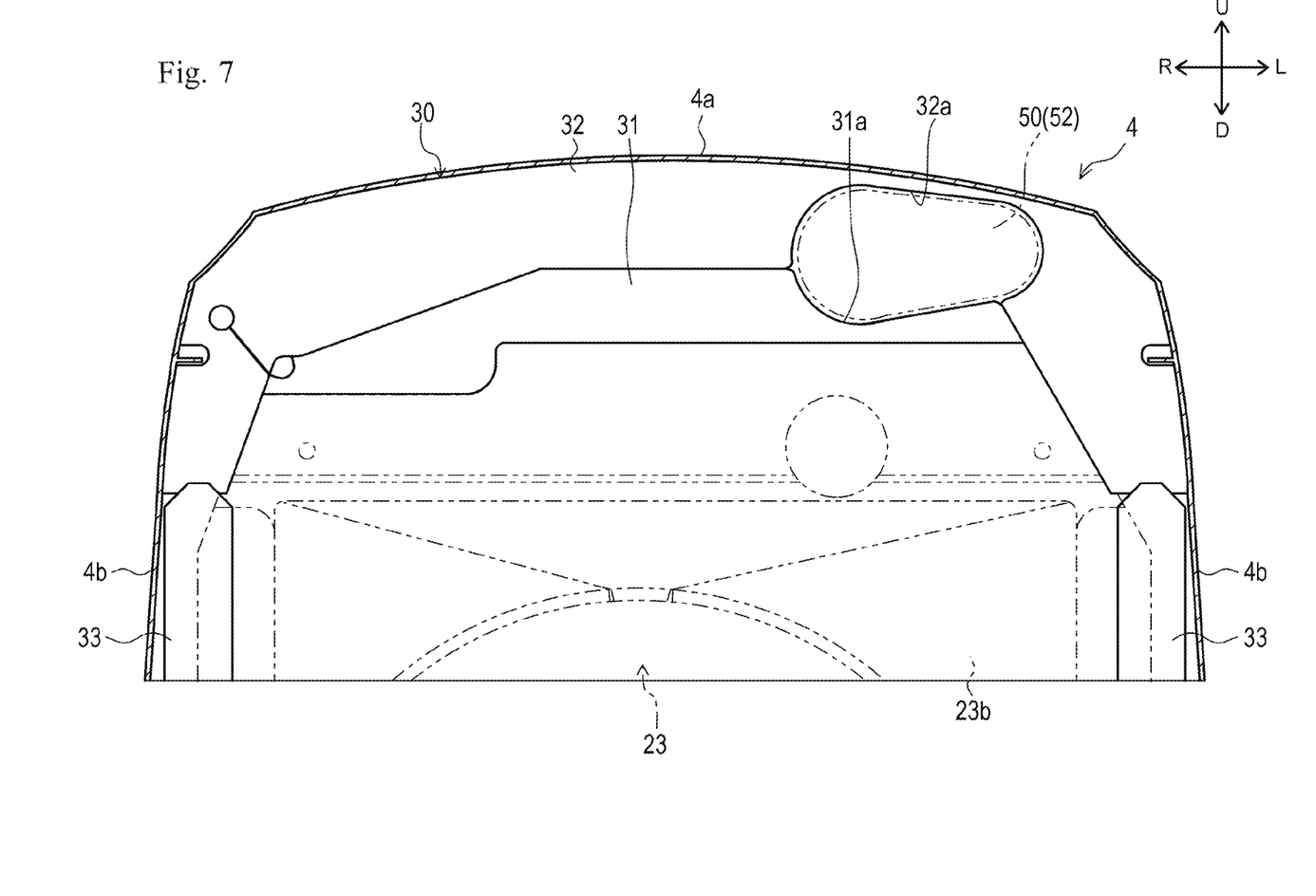
FIG. 7 is a partially cross-sectional front view of a partition portion and the radiator.

The lower shield portion 31 shown in FIG. 7 is formed in a substantially plate shape. The lower shield portion 31 is fixed to an upper face of the shroud 23b of the radiator 23. The lower shield portion 31 has a lower recess 31a. The lower recess 31a is a recess formed in a left portion of the lower shield portion 31.

Figure 6:
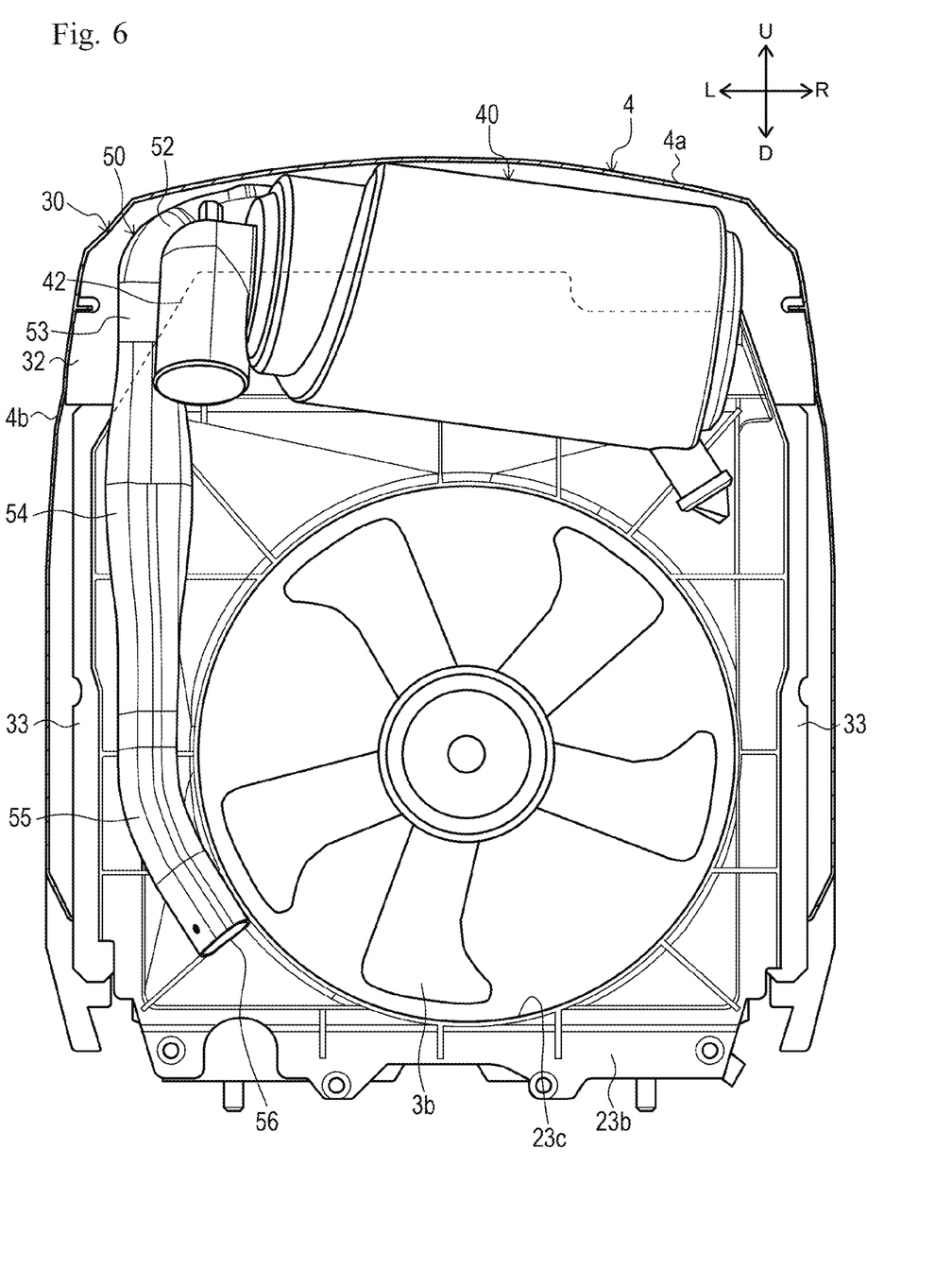
FIG. 6 is a partially cross-sectional back view of a radiator, an air cleaner, and an inlet hose.

The upper shield portion 32 shown in FIGS. 6 and 7 are formed in a substantially plate shape. The upper shield portion 32 is fixed to the hood 4. The upper shield portion 32 is formed in such a shape as to be able to come in contact with the lower shield portion 31 and the shroud 23b from above. The upper shield portion 32 has an upper recess 32a. The upper recess 32a is a recess formed in a left portion of the upper shield portion 32. The upper recess 32a is formed above the lower recess 31a of the lower shield portion 31. The upper recess 32a and the lower recess 31a opposed to each other form a substantially elongated hole in front view with a longitudinal direction oriented in the left-right direction so that a curved portion 52 of the inlet hose 50 can be disposed in the elongated hole.

The side shield portions 33 are formed in substantially plate shapes. Each of the side shield portions 33 is formed in a substantially rectangular shape in front view with a longitudinal direction oriented in a vertical direction. The side shield portions 33 are fixed to inner sides of the side panels 4b of the hood 4.

The upper shield portion 32 of the partition portion 30 formed in this manner comes in contact with the lower shield portion 31 and the side shield portions 33 of the partition portion 30 are disposed on left and right opposite sides of the core 23a of the radiator 23 when the hood 4 is closed. The lower shield portion 31, the upper shield portion 32, and the side shield portions 33 fill a clearance between the radiator 23 (the core 23a and the shroud 23b) and the hood 4 and the inner space of the hood 4 is partitioned into the front and rear spaces in the vicinity of the radiator 23. Hereinafter, the space on a front side of the radiator 23 will be referred to as the "front space S1" and the space on a rear side of the radiator 23 will be referred to as the "rear space S2".

In the front space S1 shown in FIGS. 2 and 3, the battery 21 and the straightening plates 22 are disposed. In the rear space S2, the engine 3, the cooling water hoses 24, the air cleaner 40, the inlet hose 50, and the like are disposed.

With reference to FIGS. 5A to 10B, the inlet hose 50 will be described below.

Figure 8:
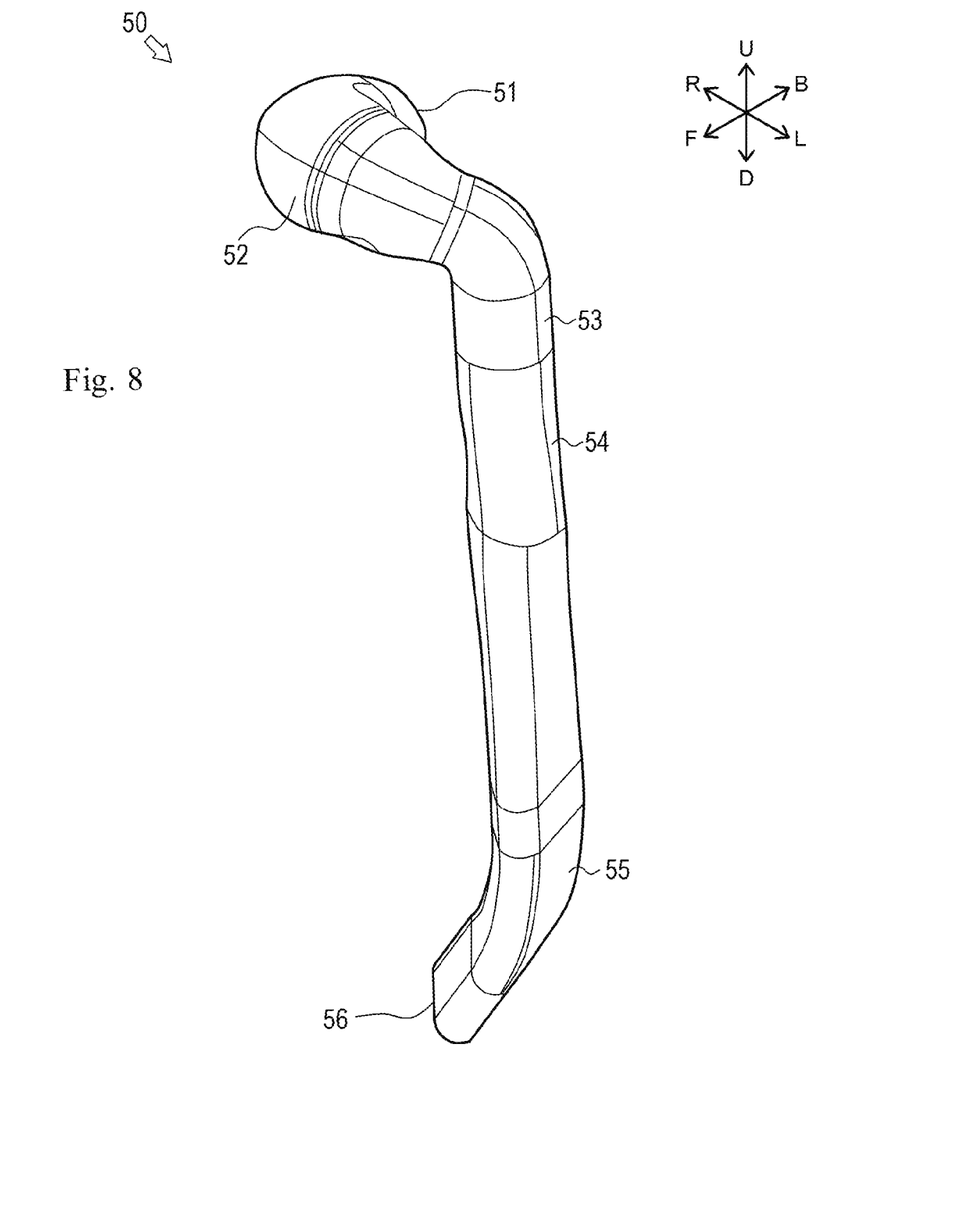
FIG. 8 is a perspective view of the inlet hose.
Figure 9A:
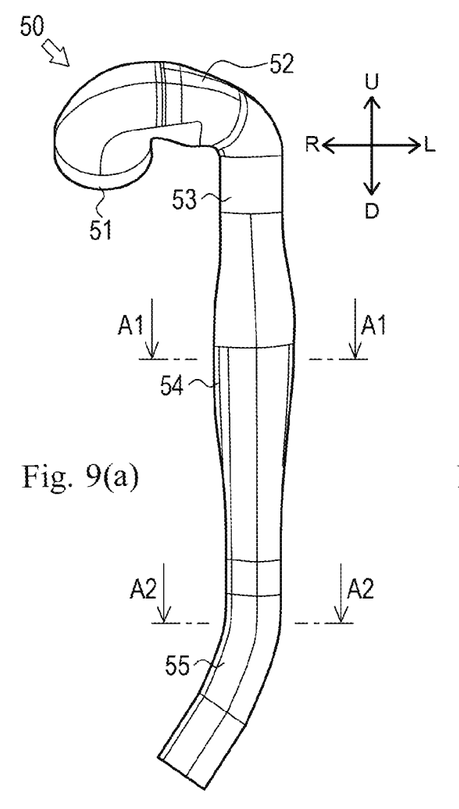
FIG. 9A is a front view of the inlet hose.
Figure 9B:
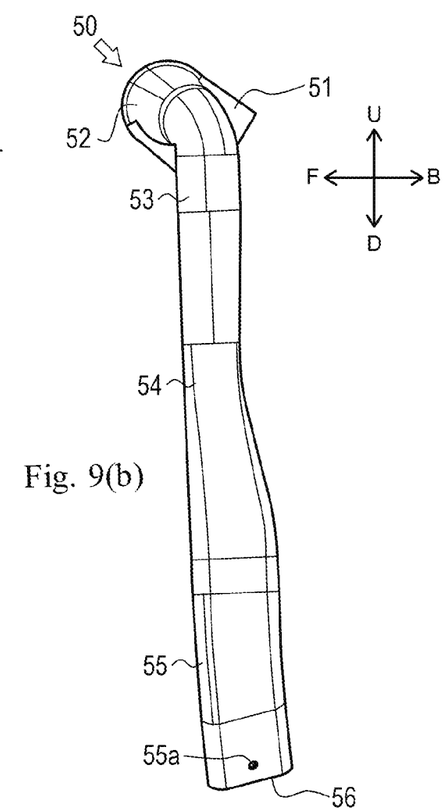
FIG. 9B is a left side view of the inlet hose.
Figure 9C:
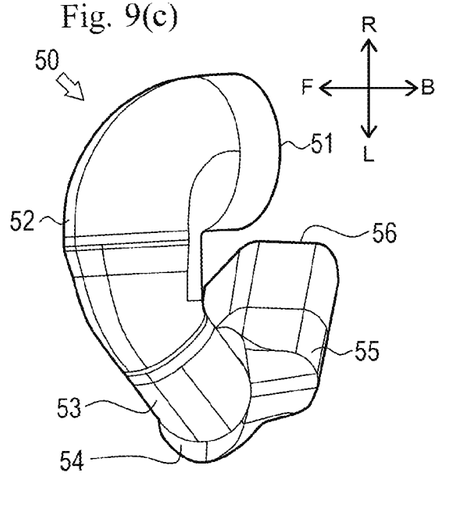
FIG. 9C is a plan view of the inlet hose.
Figure 9D:
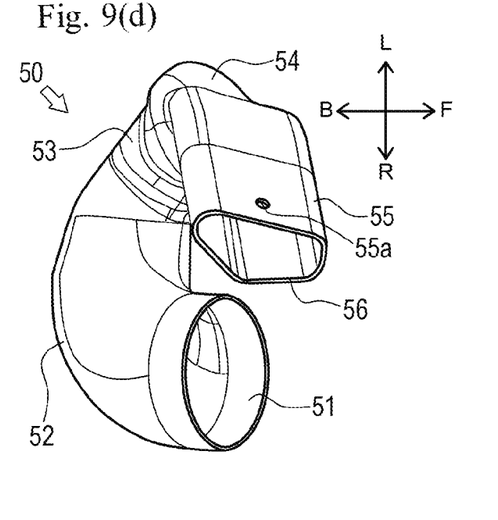
FIG. 9D is a bottom view of the inlet hose.
Figure 10A:
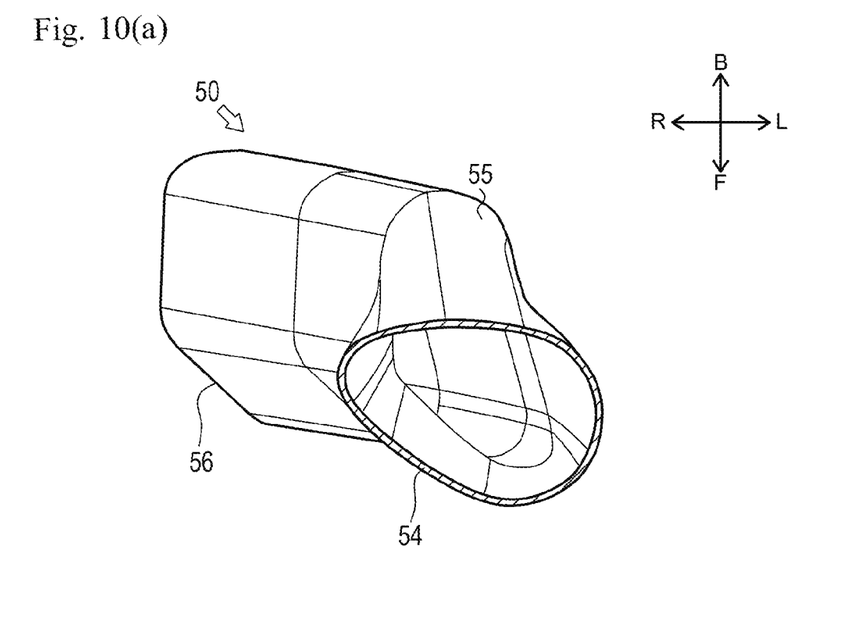
FIG. 10A is a cross-sectional view taken along line A1-A1.
Figure 10B:
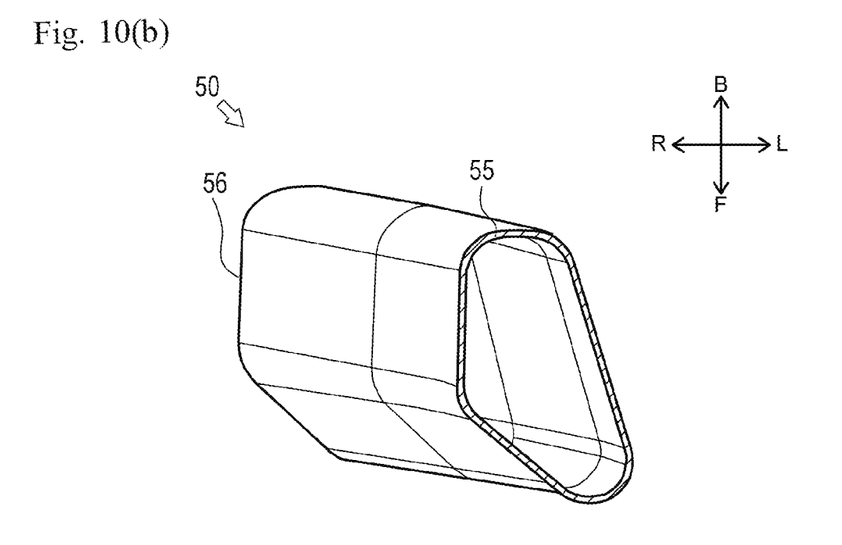
FIG. 10B is a cross-sectional view taken along line A2-A2.

As described above, the inlet hose 50 is for leading the air in the hood 4 into the air cleaner 40. The inlet hose 50 shown in FIGS. 8 to 9D is formed in a shape of a substantially cylindrical member with a longitudinal direction oriented in the vertical direction and an upper end portion and a lower end portion bent appropriately. The inlet hose 50 has a connection portion 51, the curved portion 52, a circular cylindrical portion 53, a first longitudinal portion 54, a second longitudinal portion 55, and an aspiration port 56.

The connection portion 51 is a portion at the upper end portion of the inlet hose 50 and connected to the suction port 41 of the air cleaner 40. The connection portion 51 is formed in a substantially cylindrical shape having an inside diameter substantially equal to an outside diameter of the suction port 41. The connection portion 51 is disposed with an opening facing backward and downward.

The curved portion 52 is a portion curved in such a manner as to be folded back leftward (outward in the left-right direction) from the connection portion 51. The curved portion 52 is formed in a substantially arc shape in plan view.

The circular cylindrical portion 53 is a portion formed to have a substantially annular cross-sectional shape. The circular cylindrical portion 53 is formed to extend downward from the curved portion 52.

The first longitudinal portion 54 shown in FIGS. 9A to 9D and 10A is a portion formed to have a substantially longitudinal cross-sectional shape. The cross-sectional shape of the first longitudinal portion 54 is a substantially oval annular shape in plan view with a long side oriented substantially in the left-right direction. The first longitudinal portion 54 is formed to extend downward from the circular cylindrical portion 53.

The second longitudinal portion 55 shown in FIGS. 9A to 9D and FIG. 10B is a portion formed to have a substantially longitudinal cross-sectional shape. The cross-sectional shape of the second longitudinal portion 55 is a substantially rectangular annular shape in plan view with a longitudinal direction oriented substantially in the front-back direction. The second longitudinal portion 55 is formed to extend downward from the first longitudinal portion 54. The second longitudinal portion 55 is formed to be bent at a middle portion in the vertical direction to extend rightward and downward. The second longitudinal portion 55 has a mounting hole 55a.

The mounting hole 55a is a substantially circular hole in side view formed in a left side face of the second longitudinal portion 55. The mounting hole 55a is formed in a lower portion of the second longitudinal portion 55 to communicate between an inside and an outside of the second longitudinal portion 55.

The aspiration port 56 is a portion (opening) that draws in the air in the hood 4. The aspiration port 56 is formed in a lower end portion of the second longitudinal portion 55. The aspiration port 56 is formed to be open rightward and downward. The aspiration port 56 is formed in a substantially rectangular annular shape in bottom view with a longitudinal direction oriented substantially in the front-back direction (see FIG. 9D).

The connection portion 51 of the inlet hose 50 formed in this manner is fitted over the suction port 41 of the air cleaner 40 shown in FIG. 5B. A band (not shown) is wound around the connection portion 51 to thereby fix the inlet hose 50 to the suction port 41. A push rivet is inserted into a stay (not shown) provided in the hood 4 and the mounting hole 55a to thereby fix the second longitudinal portion 55 of the inlet hose 50 shown in FIG. 5A to the stay. Thus, the inlet hose 50 is installed to be attachable and detachable in the hood 4.

The curved portion 52 of the inlet hose 50 is disposed to be folded back above the radiator 23 (the core 23a and the shroud 23b). The curved portion 52 is disposed such that the middle portion of the curved portion 52 in the front-back direction is sandwiched between the lower recess 31a and the upper recess 32a and that a front portion of the curved portion 52 protrudes forward from the partition portion 30 when the hood 4 is closed (see FIGS. 5B and 7).

As shown in FIGS. 5B and 6, the circular cylindrical portion 53 is disposed immediately behind the upper shield portion 32 of the partition portion 30. The first longitudinal portion 54 and the second longitudinal portion 55 are disposed immediately behind the shroud 23b. The first longitudinal portion 54 and the second longitudinal portion 55 are disposed along the shroud 23b from an upper end portion to a lower portion of the shroud 23b. The first longitudinal portion 54 and the second longitudinal portion 55 are disposed on a left side (an outer side in the left-right direction) of the opening 23c in the shroud 23b.

The aspiration port 56 is disposed immediately behind the shroud 23b and on an outer side of the opening 23c in the left-right direction in back view. The aspiration port 56 is disposed at a lower position than a central portion in the vertical direction of the shroud 23b of the radiator 23. The aspiration port 56 is disposed at about the same height as lower end portions of the side shield portions 33 of the partition portion 30.

The aspiration port 56 is disposed at the same position in the front-back direction and the left-right direction as (to overlap in plan view with) at least a part of the lower hose 24b. The aspiration port 56 is disposed on a lower side (a side closer to the lower hose 24b) of the alternator 64 shown in FIG. 5A in side view. Thus, the aspiration port 56 is disposed in the vicinity of the lower hose 24b.

The aspiration port 56 is disposed on a front side of the alternator 64 (a side closer to the shroud 23b) and disposed in the same position in the front-back direction as (to overlap in side view with) the fan 3b and the opening 23c. Thus, the aspiration port 56 is disposed as close as possible to the front side (the shroud 23b) in the rear space S2.

Next, the way in which air outside the hood 4 (outside air) is fed to the engine 3 in the tractor 1 including the inlet hose 50 formed as described above will be described.

When the engine 3 shown in FIG. 2 is driven, the fan 3b is driven due to the driving of the engine 3. As a result, the air outside the hood 4 flows into the front space S1 through the front panel 4c and the like. The flow of the air is straightened by the straightening plates 22 and sent into the rear space S2 by the fan 3b. The air sent into the rear space S2 in this manner is drawn from the aspiration port 56 into the inlet hose 50 and led to the air cleaner 40. The air cleaner 40 separates the dust from the air and the air is sent into the engine 3 through the outlet hose 61. Thus, the air after the removal of the dust by the air cleaner 40 is fed to the engine 3.

Here, when the tractor 1 is driven in snow (in a cold region, for example), not only the air but also the snow enter the hood 4. In the present embodiment, the aspiration port 56 is disposed in the rear space S2, which makes the snow flowing into the hood 4 less likely to reach the air cleaner 40 to thereby suppress clogging of the filter of the air cleaner 40.

To put it concretely, the snow flowing into the hood 4 first flows into the front space S1 similarly to the air. In this manner, the rear space S2 is more difficult for the snow to directly enter from outside the hood 4 than the front space S1. The snow that enters the front space S1 passes through the core 23a of the radiator 23 when the snow is sent into the rear space S2 due to the driving of the fan 3b. The snow exchanges heat with the cooling water flowing through the core 23a and melts. In this manner, the rear space S2 is difficult for the snow to directly enter and, in addition, the snow is likely to melt before flowing into the rear space S2, which results in a smaller amount of snow in the rear space S2 than in the front space S1.

Moreover, because the engine 3 is disposed in the rear space S2, the rear space S2 is higher in temperature than the front space S1. Therefore, the snow is more likely to melt in the rear space S2 than in the front space S1.

By drawing in the air from such a rear space S2, the inlet hose 50 is less likely to draw in the snow than in the case of drawing in the air from the front space S1. Thus, it is possible to make the snow less likely to reach the air cleaner 40 to thereby suppress the clogging of the filter of the air cleaner 40 with the snow.

Especially, the aspiration port 56 of the inlet hose 50 is disposed in the vicinity of the lower hose 24b connected to the lower end portion of the core 23a. Thus, the inlet hose 50 can draw in the air from a relatively low position in the rear space S2 where the snow is less likely to be blowing. The inlet hose 50 can draw in the air in the vicinity of the lower hose 24b where a temperature becomes higher than an outside air temperature and the snow easily melts. Thus, it is possible to make the aspiration port 56 less likely to draw in the snow to thereby effectively suppress the clogging of the filter of the air cleaner 40 with the snow.

The inlet hose 50 can disturb the flow of the air flowing through the inlet hose 50 with the curved portion 52 to thereby facilitate melting of the snow (by bringing the snow into contact with a side wall of the inlet hose 50 to help the snow melt, for example).

To dispose the aspiration port 56 of the inlet hose 50 at the low position as in the embodiment, the inlet hose 50 is formed to be relatively long in the vertical direction. Here, because the lots of members are disposed in the hood 4, it is necessary to contrive a way to avoid interference of the inlet hose 50 with the other members in the hood 4. In the embodiment, the interference with the other members is avoided by changing the cross-sectional shape of the inlet hose 50 along the longitudinal direction (forming the circular cylindrical portion 53, the first longitudinal portion 54, and the second longitudinal portion 55 in the different shapes in cross-section, for example). At this time, the cross-sectional shapes of the respective portions are set such that the inlet hose 50 has a substantially constant sectional area (flow passage area) along the longitudinal direction. Thus, by making a flow velocity of the air in the inlet hose 50 substantially constant (not providing a section of a high flow velocity), it is possible make the snow less likely to reach the air cleaner 40 to thereby suppress the clogging of the filter of the air cleaner 40.

As described above, the tractor 1 (work vehicle) according to the embodiment includes the radiator 23 that cools the cooling water for the engine 3, the air cleaner 40 that cleans the air to be fed to the engine 3, and the inlet hose 50 that has the aspiration port 56 open on the rear side of the radiator 23 and leads the air from the aspiration port 56 to the air cleaner 40.

With this configuration, it is possible to suppress the clogging of the filter of the air cleaner 40 with the snow.

The radiator 23 has the shroud 23b having the opening 23c in which the fan 3b of the engine 3 is disposed and the aspiration port 56 is disposed not to overlap with the opening 23c of the shroud 23b in back view.

With this configuration, it is possible to dispose the aspiration port 56 at the position (behind (on a back side of) the shroud 23b) where a velocity of wind (wind velocity) caused by the driving of the fan 3b is lower and the snow is less likely to blow in. Thus, it is possible to suppress the drawing in of the snow from the aspiration port 56 to thereby effectively suppress the clogging of the filter of the air cleaner 40 with the snow.

Especially, in the embodiment, the aspiration port 56 is disposed close to the shroud 23b to such an extent that the aspiration port 56 overlaps with the opening 23c of the shroud 23b in side view. Thus, the aspiration port 56 is disposed on the outer side of the opening 23c (behind a peripheral edge) to be able to draw in the air at the position to which the air flowing through the opening 23c is less likely to be directly led. Thus, it is possible to effectively suppress the drawing in of the snow from the aspiration port 56.

The aspiration port 56 is disposed at a lower position than a central portion in the vertical direction of the radiator 23.

With this configuration, it is possible to dispose the aspiration port 56 at the low position to thereby make the aspiration port 56 less likely to draw in the snow floating in the rear space. Thus, it is possible to effectively suppress the clogging of the filter of the air cleaner 40 with the snow.

The aspiration port 56 is disposed in the vicinity of the cooling water hoses 24 through which the cooling water flows between the radiator 23 and the engine 3.

With this configuration, it is possible to dispose the aspiration port 56 at the position where a temperature becomes higher than the outside air temperature during driving of the tractor 1 (in the vicinity of the cooling water hoses 24 where the snow easily melts) to thereby suppress the drawing in of the snow from the aspiration port 56. Thus, it is possible to effectively suppress the clogging of the filter of the air cleaner 40 with the snow.

Moreover, the cooling water hoses 24 include the lower hose 24b through which the cooling water flows between a lower portion of the radiator 23 and the engine 3 and the aspiration port 56 is disposed in the vicinity of the lower hose 24b.

With this configuration, it is possible to dispose the aspiration port 56 at the relatively low position where the temperature becomes relatively high (in the vicinity of the lower hose 24b). Thus, it is possible to make the aspiration port 56 less likely to draw in the snow to thereby effectively suppress the clogging of the filter of the air cleaner 40 with the snow.

The aspiration port 56 is disposed to overlap with the lower hose 24b in plan view.

With this configuration, it is possible to arrange the aspiration port 56 and the lower hose 24b in the vertical direction to save space.

The air cleaner 40 is disposed on the rear side of the radiator 23.

With this configuration, it is possible to dispose the air cleaner 40 on the same side as the aspiration port 56, which facilitates installation of the inlet hose 50.

The inlet hose 50 is installed along the radiator 23 from the upper portion to the lower portion of the radiator 23 with the upper end portion connected to the air cleaner 40 and the aspiration port 56 formed in the lower end portion.

With this configuration, it is possible to increase an entire length of the inlet hose 50 to thereby help the snow melt due to contact with the side wall, inside heat, and the like while the snow flows through the inlet hose 50. Thus, in the event of drawing in of the snow from the aspiration port 56, it is possible to make the snow less likely to reach the air cleaner 40 to thereby effectively suppress the clogging of the filter of the air cleaner 40 with the snow.

The tractor 1 according to the embodiment is an embodiment of the work vehicle according to the disclosure.

Although the embodiment of the disclosure has been described above, the disclosure is not limited to the above-described configuration and can be changed in various ways without departing from a scope of the disclosure described in the claims.

For example, although the work vehicle according to the embodiment is the tractor 1, the type of the work vehicle according to the disclosure is not limited to the tractor 1. The work vehicle according to the disclosure may be other agricultural vehicles, construction vehicles, industrial vehicles, and the like.

Although the aspiration port 56 is disposed not to overlap with the opening 23c of the shroud 23b in back view, a positional relationship between the aspiration port 56 and the shroud 23b is not limited to this positional relationship. For example, the aspiration port 56 and the opening 23c may overlap with each other in back view.

Although the aspiration port 56 is disposed at the lower position than the central portion in the vertical direction of the shroud 23b as an example of the configuration in which the aspiration port 56 is disposed at the lower position than the central portion in the vertical direction of the radiator 23, the configuration is not limited to this configuration. For example, the aspiration port 56 may be disposed at a lower position than a central portion in the vertical direction of the core 23a. The aspiration port 56 may be disposed at a lower position than a central portion in the vertical direction of the core 23a and the shroud 23b (the entire radiator 23).

The inlet hose 50 is formed along the shroud 23b from the upper end portion to the lower portion of the shroud 23b, which is not necessarily the case in the disclosure. For example, the inlet hose 50 may be disposed in the vicinity of an upper portion of the shroud 23b (without extending to the lower portion).

Although the aspiration port 56 overlaps with the lower hose 24b in plan view and is disposed on the side of the alternator 64 closer to the lower hose 24b as an example of the configuration in which the aspiration port 56 is disposed in the vicinity of the lower hose 24b, the configuration is not limited to this configuration. The aspiration port 56 only needs to be disposed at a position close to the lower hose 24b to such an extent that an influence of the heat from the lower hose 24b helps the snow melt.

Although the aspiration port 56 is disposed in the vicinity of the lower hose 24b as an example of the configuration in which the aspiration port 56 is disposed in the vicinity of the cooling water hoses 24, the configuration is not limited to this configuration. For example, the aspiration port 56 may be disposed in the vicinity of the upper hose 24a. With this structure, it is possible to dispose the aspiration port 56 in the vicinity of the upper hose 24a where a temperature is higher (the snow more easily melts) than in the vicinity of the lower hose 24*b* to thereby effectively suppress the drawing in of the snow from the aspiration port 56.

The aspiration port 56 does not necessarily have to be disposed in the vicinity of the cooling water hoses 24 (the upper hose 24*a* and the lower hose 24*b*). With the objective of suppressing the drawing in of the snow, the aspiration port 56 is preferably disposed in the vicinity of a member that becomes relatively high in temperature or at a position where a wind velocity is low.

The aspiration port 56 overlaps with the lower hose 24*b* in plan view, which is not necessarily the case in the disclosure. The aspiration port 56 may be disposed at a position displaced from the lower hose 24*b* in plan view.

Although the air cleaner 40 is disposed on the rear side of the radiator 23, a positional relationship between the air cleaner 40 and the radiator 23 is not limited to this positional relationship and may be an arbitrary positional relationship. For example, the air cleaner 40 may be disposed on the front side of the radiator 23.

What is claimed is:

1. A work vehicle comprising:
    a radiator that cools cooling water for an engine;
    an air cleaner that cleans air to be fed to the engine; and
    an inlet hose that has an aspiration port open on a rear side of the radiator in a front-back direction of a vehicle body and leads the air from the aspiration port to the air cleaner,
    wherein the radiator includes a shroud having an opening in which a fan driven due to the driving of the engine is disposed, and
    wherein the aspiration port is disposed behind the shroud in the front-back direction of the vehicle body.

2. The work vehicle as claimed in claim 1, wherein the aspiration port is disposed not to overlap with the opening of the shroud in back view.

3. The work vehicle as claimed in claim 2, wherein the aspiration port is disposed at a lower position than a central portion in a vertical direction of the radiator.

4. The work vehicle as claimed in claim 3, wherein the aspiration port is disposed in a vicinity of a cooling water hose through which the cooling water flows between the radiator and the engine.

5. The work vehicle as claimed in claim 4, wherein the cooling water hose includes a lower hose through which the cooling water flows between a lower portion of the radiator and the engine, and
    the aspiration port is disposed in a vicinity of the lower hose.

6. The work vehicle as claimed in claim 5, wherein the aspiration port is disposed to overlap with the lower hose in plan view.

7. The work vehicle as claimed in claim 2, wherein the aspiration port is disposed in a vicinity of a cooling water hose through which the cooling water flows between the radiator and the engine.

8. The work vehicle as claimed in claim 2, wherein the air cleaner is disposed on the rear side of the radiator.

9. The work vehicle as claimed in claim 1, wherein the aspiration port is disposed at a lower portion than a central portion in a vertical direction of the radiator.

10. The work vehicle as claimed in claim 9, wherein the aspiration port is disposed in a vicinity of a cooling water hose through which the cooling water flows between the radiator and the engine.

11. The work vehicle as claimed in claim 10, wherein the cooling water hose includes a lower hose through which the cooling water flows between a lower portion of the radiator and the engine, and
    the aspiration port is disposed in a vicinity of the lower hose.

12. The work vehicle as claimed in claim 11, wherein the aspiration port is disposed to overlap with the lower hose in plan view.

13. The work vehicle as claimed in claim 1, wherein the aspiration port is disposed in a vicinity of a cooling water hose through which the cooling water flows between the radiator and the engine.

14. The work vehicle as claimed in claim 13, wherein the cooling water hose includes a lower hose through which the cooling water flows between a lower portion of the radiator and the engine, and
    the aspiration port is disposed in a vicinity of the lower hose.

15. The work vehicle as claimed in claim 14, wherein the aspiration port is disposed to overlap with the lower hose in plan view.

16. The work vehicle as claimed in claim 14, wherein the air cleaner is disposed on the rear side of the radiator.

17. The work vehicle as claimed in claim 13, wherein the air cleaner is disposed on the rear side of the radiator.

18. The work vehicle as claimed in claim 1, wherein the air cleaner is disposed on the rear side of the radiator.

19. The work vehicle as claimed in claim 1, wherein the inlet hose is installed along the radiator from an upper portion to a lower portion of the radiator with an upper end portion connected to the air cleaner and the aspiration port formed in a lower end portion.

20. The work vehicle as claimed in claim 1, wherein the air cleaner is disposed on the rear side of the radiator.

* * * * *